United States Patent [19]
Weber

[11] Patent Number: 4,682,622
[45] Date of Patent: Jul. 28, 1987

[54] PRESSURE REGULATING VALVE

[75] Inventor: Kent Weber, Rockford, Ill.

[73] Assignee: Sundstrand Corporation, Rockford, Ill.

[21] Appl. No.: 807,608

[22] Filed: Dec. 11, 1985

[51] Int. Cl.$^4$ ...................... G05D 16/00; F16K 31/126
[52] U.S. Cl. .................................... 137/154; 137/489; 137/492.5
[58] Field of Search ...................... 137/489, 492.5, 492, 137/154

[56] References Cited

U.S. PATENT DOCUMENTS

| | | |
|---|---|---|
| 917,443 | 4/1909 | John ..................................... 137/489 |
| 1,091,536 | 3/1914 | Ross ..................................... 137/489 |
| 1,546,466 | 7/1925 | Bayles . |
| 2,991,796 | 7/1961 | Griswold ............................. 137/489 |
| 3,097,664 | 7/1963 | Henle . |
| 3,583,432 | 6/1971 | Powell et al. . |
| 3,805,823 | 4/1974 | Kakegawa . |

FOREIGN PATENT DOCUMENTS

| | | | |
|---|---|---|---|
| 18607 | of 1907 | United Kingdom ................ 137/489 |
| 531956 | 9/1976 | U.S.S.R. .............................. 137/489 |

Primary Examiner—Alan Cohan
Attorney, Agent, or Firm—Wood, Dalton, Phillips, Mason & Rowe

[57] ABSTRACT

To provide a pressure regulating valve which is self-powered and has no sliding parts, is capable of controlling fluid pressure to a fixed delta pressure above a sensed vapor pressure, and is otherwise suited for utilization in a two phase thermal management system, a valve body is provided having an inlet port and an outlet port, and a first valve member is adapted to move between an open and a closed position to open and close the inlet port. A first pressurized chamber communicates with the inlet port and acts on the first valve member while a second pressurized chamber communicates with the outlet port and selectively communicates with the first pressurized chamber by means of a second valve member adapted to move between an open and a closed position to open and close a passage between the chambers. Additionally, the pressure regulating valve is constructed such that the first valve member is normally biased toward the closed position in opposition to pressure in the inlet port and the second valve member is normally biased toward the open position in opposition to pressure in the outlet port.

9 Claims, 1 Drawing Figure

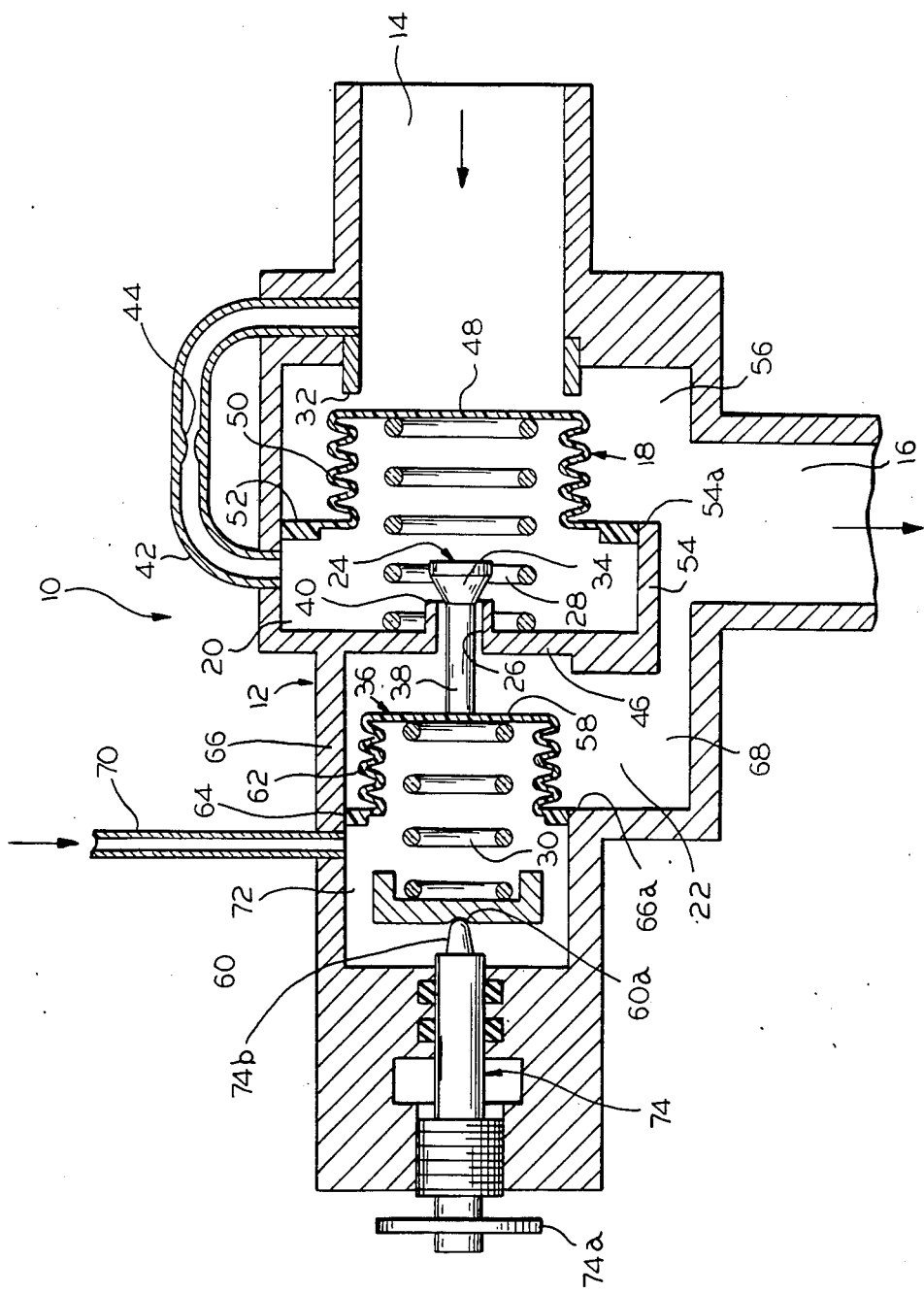

PRESSURE REGULATING VALVE

FIELD OF THE INVENTION

This invention relates to a pressure regulating valve, and more specifically, to a liquid pressure regulating valve for a two phase thermal management system.

BACKGROUND OF THE INVENTION

Pressure regulating valves for a variety of applications have been known for many years. One application is that of controlling the temperature of a fluid in a fluid circulation system by controlling fluid pressure in the system. Most frequently, this is accomplished by means of complicated valves having a number of sliding parts.

In one application, a pressure regulating valve is required in a two phase thermal management system designed for use in space stations. It is important in such applications to have an integrated thermal management system to control component temperature and one technique for providing constant temperature with variable heat loads is to use a two phase thermal management system where liquid is circulated through the components and partially vaporized by heat extracted from the components. In such application, the mixture of liquid and vapor leaving the components is transported to a condenser where heat is rejected to space by means of a radiator.

In practice, the failure of valves in space-related systems has been a serious problem. Conventional valves having moving and/or sliding parts such as that disclosed in Bayles U.S. Pat. No. 1,546,466 fail to meet the stringent reliability requirements for space qualified thermal cooling systems since they can easily stick due to the close tolerances of the relatively movable parts and the fact that they do not have sufficient force to overcome any impediment to normal movement. Moreover, it is well known that conventional valves can wear over time leading to failure.

Among other attempts to provide valves for various applications are those disclosed in U.S. Pat. Nos. 3,097,664; 3,583,432; and 3,805,823.

While overcoming problems of the type indicated hereinabove, it is desirable to provide a reliable pressure regulating valve to control fluid pressure to a fixed delta pressure above a sensed vapor pressure. It is also desirable to provide a pressure regulating valve which is self-powered and has no sliding parts. Further, it is desirable to provide a pressure regulating valve for use in space stations where individual pieces of equipment and experiments can be plugged into a thermal bus as needed.

The present invention is directed to overcoming the above stated problems and accomplishing the stated objects.

SUMMARY OF THE INVENTION

It is a principal object of the present invention to provide a new and improved pressure regulating valve. More specifically, it is an object of the invention to provide a liquid pressure regulating valve for a two phase thermal management system. It is likewise an object of the invention to provide a pressure regulating valve having a unique construction adapted for space-related applications.

An exemplary embodiment of the invention achieves the foregoing objects in a pressure regulating valve having a valve body with an inlet port and an outlet port, and a first valve member is adapted to move between an open and a closed position to open and close the inlet port. A first pressurized chamber communicates with the inlet port and acts on the first valve member while a second pressurized chamber communicates with the outlet port and selectively communicates with the first pressurized chamber by means of a second valve member adapted to move between an open and a closed position to open and close a passage between the chambers. Additionally, the pressure regulating valve includes means normally biasing the first valve member toward the closed position in opposition to pressure in the inlet port and means normally biasing the second valve member toward the open position in opposition to pressure in the outlet port.

In the exemplary embodiment, the first and second valve members are automatically positioned in relation to the respective open and closed positions to maintain a preselected pressure in the outlet port. For this purpose, a valve seat surrounds the inlet port such that the first valve member is in the closed position when in engagement with the inlet valve seat and a valve seat surrounds the passage between the pressurized chambers such that the second valve member is in the closed position when in engagement with the passage valve seat. With this arrangement, the first valve member is preferably a bellows assembly defining the first pressurized chamber and the second valve member preferably includes a valve head and valve stem operatively associated with another bellows assembly.

In a preferred embodiment, the first pressurized chamber communicates with the inlet port through a conduit having a restriction therein. It is also advantageous for the first valve member biasing means to include a spring acting with fluid pressure in the first pressurized chamber and the second valve member biasing means to include a spring acting against fluid pressure in the second pressurized chamber. Additionally, a pressurized vapor chamber communicates directly with a vapor pressure sensing port which communicates directly with vapor used in a two phase thermal management system.

With this construction, the pressurized vapor chamber is disposed such that vapor pressure therein tends to open the second valve member. Specifically, the liquid being circulated through the liquid pressure regulating valve is partially boiled off downstream of the regulated liquid outlet port, and the liquid and vapor are transported to a condenser where heat is rejected to space by means of a radiator. However, the vapor pressure is transmitted to the vapor chamber through the sensing port to control the liquid pressure regulating valve.

Other objects and advantages will become apparent from the following specification taken in connection with the accompanying drawings.

DESCRIPTION OF THE DRAWING

The drawing is a cross sectional view of a pressure regulating valve in accordance with the present invention.

DESCRIPTION OF THE PREFERRED EMBODIMENT

An exemplary embodiment of a pressure regulating valve in accordance with the invention is illustrated in the drawing. The pressure regulating valve 10 includes a valve body 12 having an inlet port 14 and an outlet port 16 together with a first valve member 18 adapted to move between an open and a closed position to open and close the inlet port 14. A first pressurized chamber 20 communicates with the inlet port 14 and acts on the first valve member 18 and a second pressurized chamber 22 communicates with the outlet port 16 and selectively communicates with the first pressurized chamber 20. The pressure regulating valve 10 also includes a second valve member 24 adapted to move between an open and a closed position to open and close a passage 26 between the pressurized chambers 20 and 22. With this arrangement, the first and second valve members 18 and 24 are automatically positioned in relation to the respective open and closed positions to maintain a preselected pressure in the outlet port 16.

More specifically, the pressure regulating valve 10 includes means such as the spring 28 normally biasing the first valve member 18 toward the closed position in opposition to pressure in the inlet port 14 and means such as the spring 30 normally biasing the second valve member 24 toward the open position in opposition to pressure in the outlet port 16.

As shown, a valve seat 32 surrounds the inlet port 14 such that the first valve member 18 in the closed position is in engagement with the valve seat 32. Preferably, the first valve member 18 is a bellows assembly defining the first pressurized chamber 20 and the second valve member 24 includes a valve head 34 operatively connected to a bellows assembly 36 by means of a valve stem 38. Also, as shown, a valve seat 40 surrounds the passage 26 between the pressurized chambers 20 and 22 such that the second valve member 24 in the closed position is in engagement with the valve seat 40.

In accordance with the present invention, the pressure regulating valve 10 is constructed such that the first pressurized chamber 20 directly and continuously communicates with the inlet port 14 through a conduit 42 having a restriction as at 44 therein. It will be appreciated that the conduit 42 transmits pressure in the inlet port 14 to the first pressurized chamber 20, although with a pressure drop by reason of the restriction 44. As a result, the restriction 44 accommodates flow from the inlet port 14 into the first pressurized chamber 20 and the second valve member 24 controls flow from the first pressurized chamber 20 into the second pressurized chamber 22.

As previously mentioned, the pressure regulating valve 10 is constructed such that the first valve member biasing means includes a spring 28 and the second valve member biasing means includes a spring 30. It will be appreciated that the spring 28 acts with fluid pressure in the first pressurized chamber 20 to tend to close the valve member 18, i.e., move the bellows assembly into contact with the valve seat 32 whereas the spring 30 acts against fluid pressure in the second pressurized chamber 22 to tend to open the second valve member 24, i.e., move the valve head 34 away from engagement with the valve seat 40. In other words, fluid pressure in the first pressurized chamber 20 is aided by the spring 28 in applying a force tending to close the first valve member 18 whereas fluid pressure in the second pressurized fluid chamber 22 is opposed by the spring 30 in tending to close the second valve member 24.

As shown, the spring 28 is disposed between an interior wall 46 surrounding the fluid passage 26 between the first and second pressurized chambers 20 and 22 and a flat valve surface 48 of the bellows assembly 18. The bellows assembly 18 also includes an accordian-like side wall 50 together with a circumferential extension 52 joined to a cylindrical wall 54 of the pressure regulating valve 10. As shown, the interior portion of the cylindrical wall 54 is cut away as at 54a to define a flow path 56 through which fluid may flow from the fluid inlet port 14 to the fluid outlet port 16 when the bellows assembly 18 is in an open position.

As will be appreciated, the valve head 34 of the second valve member 24 is disposed within the first pressurized fluid chamber 20. Also, as shown, the valve stem 38 extends through the fluid passage 26 into the second pressurized fluid chamber 22 and is joined to a flat bellows surface 58 of the bellows assembly 36 for movement therewith. With this arrangement, the spring 30 is disposed between a spring retaining cap 60 and the side of the flat bellows surface 58 opposite the valve stem 38.

Still referring to the bellows assembly 36, it includes an accordian-like side wall 62 terminating in a circumferential extension 64 connected to a cylindrical wall 66 of the pressure regulating valve 10. In this connection, the cylindrical wall 66 includes an interior cut away portion 66a defining a flow path 68 facilitating communication between the second pressurized fluid chamber 22 and the fluid outlet port 16.

In a two phase thermal management system, the liquid pressure regulating valve 10 utilizes the liquid outlet port 16 in a regulated fashion to supply a liquid to be used in both a liquid and a vapor state. For this purpose, a vapor pressure sensing port 70 is provided together with a pressurized vapor chamber 72 communicating directly with the vapor pressure sensing port 70 which, in turn, communicates directly with the vapor used in the two phase thermal management system. With this arrangement, the pressurized vapor chamber 72 is disposed such that the combined force of the spring 30 and the vapor pressure therein tends to open the second valve member 24.

As will be appreciated, the vapor pressure in the pressurized vapor chamber 72 acts with the spring 30 to bias the second valve member 24 toward an open position against liquid pressure in the second pressurized liquid chamber 22. It will also be appreciated that means can be provided such as the threaded screw 74 for adjusting the biasing force of the spring 30 relative to the bellows assembly 36. As shown, the threshold screw 74 includes a handle portion 74a to be gripped externally of the pressure regulating valve 10 and a nose portion 74b adapted to be disposed in a depression 60a of the cap 60.

With the liquid pressure regulating valve 10 as described, regulated output pressure in the second pressurized liquid chamber 22 is opposed to the sensed vapor pressure in the pressurized vapor chamber 72 and the adjusted biasing force of the spring 30. As pressure in the second pressurized chamber 22 rises to the desired level, the bellows assembly 36 is moved against the adjusted biasing force of the spring 30 and the sensed vapor pressure in the pressurized vapor chamber 72 tending to close the second valve member 24 by moving the valve head 34 toward engagement with the valve seat 40. As the second valve member 24 closes, liquid flowing from the first pressurized liquid chamber 20 into the second pressurized liquid chamber 22 is reduced and the pressure in the first pressurized liquid chamber 20 due to the influx of fluid from the liquid inlet port 14 is increased.

As a result, the flat valve surface 48 of the bellows assembly defining the first valve member 18 moves toward the valve seat 32 to reduce the flow from the liquid inlet port 14 to the second pressurized liquid chamber 22 because of the combined increase in pressure in the first pressurized liquid chamber 20 and the biasing force of the spring 28. As the flow is reduced, the pressure in the second pressurized liquid chamber 22 falls thereby permitting the second valve member 24 to open by moving the valve head 34 away from the valve seat 40 to open the liquid passage 26. As will be appreciated, this adjustment process continues until the flow throttling at the valve seat 32 is just sufficient to maintain the pressure in the second pressurized liquid chamber 22 at the preset delta pressure above the vapor pressure transmitted into the pressurized vapor chamber 72 by the vapor pressure sensing port 70.

With the present invention, the pressure regulating valve is characterized by a simple, selfpowered construction utilizing no sliding parts. The simplicity of the valve renders it extremely reliable and accurate for controlling a liquid pressure to a fixed delta pressure above a sensed vapor pressure. Accordingly, the pressure regulating valve is well suited for providing constant temperature with variable heat loads in a two phase thermal management system where liquid is circulated through the components and partially vaporized by heat extracted from the components.

While in the foregoing there has been set forth a preferred embodiment of the invention, it is to be understood that the invention is only to be limited by the spirit and scope of the appended claims.

I claim:

1. A liquid pressure regulating valve for a two phase thermal management system, comprising:
    a valve body having a liquid inlet port, a regulated liquid outlet port for supplying a liquid to be partially vaporized to a variable degree into both a liquid and a vapor state, with the degree of vaporization being dependent upon a variable heat load applied to said liquid downstream of said outlet port, and a vapor pressure sensing port;
    a first valve member adapted to move between an open position and a closed position to open and close said liquid inlet port;
    a first pressurized liquid chamber communicating directly with said liquid inlet port through a liquid conduit having a restriction therein, said first pressurized liquid chamber being disposed such that liquid pressure therein tends to close said first valve member;
    a second pressurized liquid chamber communicating directly with said regulated liquid outlet port, said second pressurized liquid chamber being in selective communication with said first pressurized liquid chamber;
    a second valve member adapted to move between an open position and a closed position to open and close a liquid passage between said pressurized liquid chambers;
    said second pressurized liquid chamber being disposed such that liquid pressure therein tends to close said second valve member; and
    a pressurized vapor chamber communicating directly with said vapor pressure sensing port, said vapor pressure sensing port communicating directly with said vapor produced by partial vaporization of said liquid in said two phase thermal management system, said pressurized vapor chamber being disposed such that vapor pressure therein tends to open said second valve member;
    said first and second valve members being automatically positioned in relation to said respective open and closed postions to maintain a preselected pressure in said regulated liquid outlet port.

2. The liquid pressure regulating valve as defined by claim 1 including a first valve seat surrounding said inlet port, said first valve member in said closed position being in engagement with said first valve seat, and including a second valve seat surrounding said liquid passage between said pressurized liquid chambers, said second valve member in said closed position being in engagement with said second valve seat.

3. The liquid pressure regulating valve as defined by claim 2 wherein said first valve member is a first bellows assembly defining said first pressurized liquid chamber, said first bellows assembly communicating with said liquid inlet port through said liquid conduit having said restriction therein.

4. The liquid pressure regulating valve as defined by claim 3 including means in addition to said liquid pressure in said first pressurized liquid chamber normally biasing said first valve member toward said closed position and means in opposition to said liquid pressure in said second pressurized liquid chamber normally biasing said second valve member toward said open position.

5. The liquid pressure regulating valve as defined by claim 4 wherein said means biasing said first valve member includes a spring acting with liquid pressure in said first pressurized liquid chamber, said spring being operatively associated with said first bellows assembly.

6. The liquid pressure regulating valve as defined by claim 5 wherein said second valve member includes a valve head within said first pressurized liquid chamber and a valve stem extending through said liquid passage into said second pressurized liquid chamber.

7. The liquid pressure regulating valve as defined by claim 6 wherein said valve stem is operatively associated with a second bellows assembly disposed within said second pressurized liquid chamber for movement therewith.

8. The liquid pressure regulating valve as defined by claim 7 wherein said means biasing said second valve member includes a spring acting against liquid pressure in said second pressurized liquid chamber, said spring being operatively associated with said second bellows assembly.

9. The liquid pressure regulating valve as defined by claim 8 including means for adjusting the biasing force of said spring relative to said second bellows assembly.

* * * * *